M. EWING.
KNOTTER.
APPLICATION FILED JAN. 19, 1916.

1,192,878.

Patented Aug. 1, 1916.
2 SHEETS—SHEET 1.

Witnesses
Wm. Conway.
C. R. Ziegler.

Inventor
Moses Ewing
By Joshua R. H. Potts.
his Attorney

M. EWING.
KNOTTER.
APPLICATION FILED JAN. 19, 1916.
1,192,878.
Patented Aug. 1, 1916.
2 SHEETS—SHEET 2.
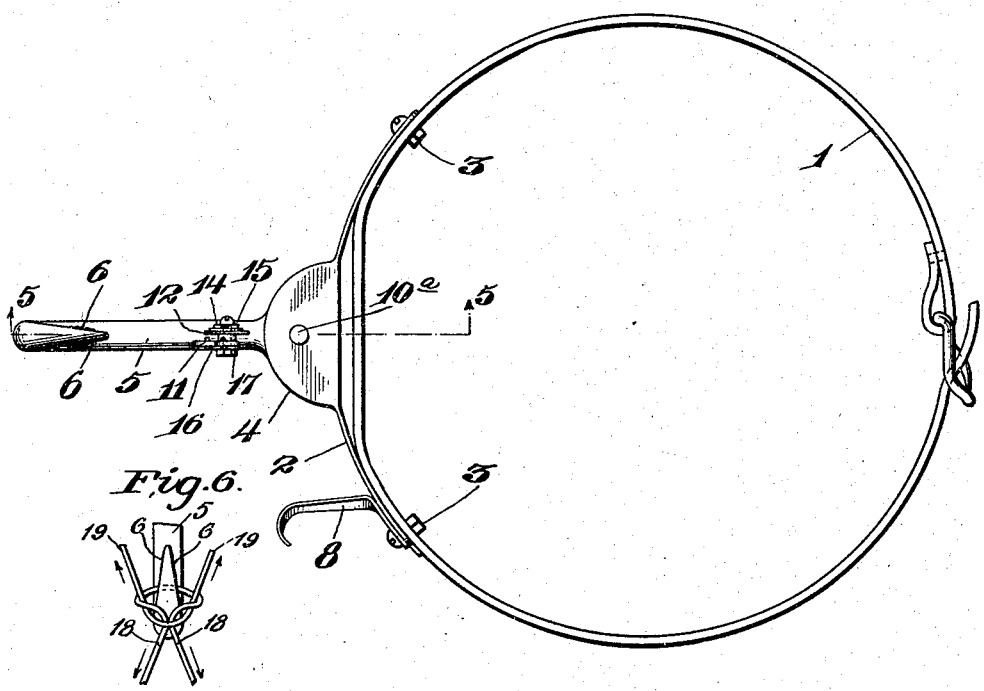
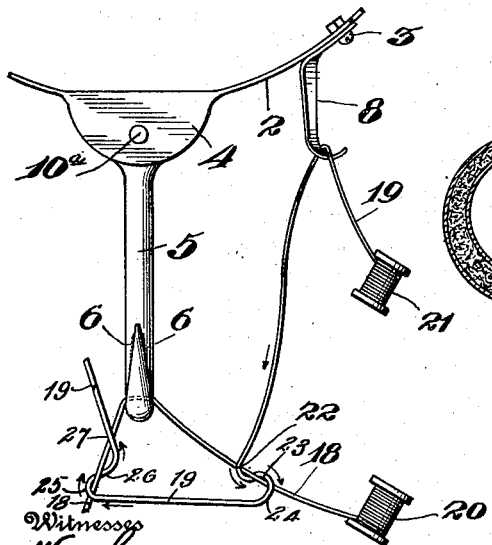
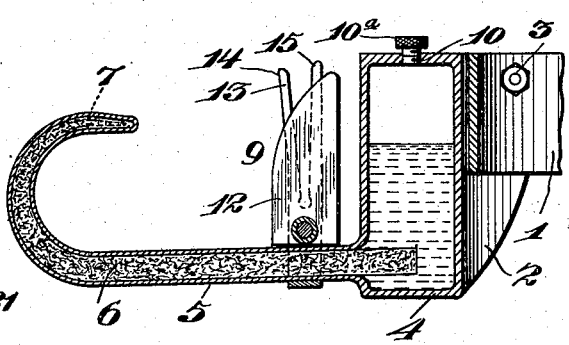
Inventor
Moses Ewing,
By Joshua R. H. Potts.
His Attorney
Witnesses
Wm. Conway
C. R. Ziegler.

UNITED STATES PATENT OFFICE.

MOSES EWING, OF CHESTER, PENNSYLVANIA.

KNOTTER.

1,192,878.  Specification of Letters Patent.  Patented Aug. 1, 1916.

Application filed January 19, 1916. Serial No. 73,008.

*To all whom it may concern:*

Be it known that I, MOSES EWING, a citizen of the United States, residing at Chester, in the county of Delaware and State of Pennsylvania, have invented certain new and useful Improvements in Knotters, of which the following is a specification.

My invention relates to improvements in knotters, and more particularly to a knotter for use by coners and spoolers, the object of the invention being to provide an improved apparatus supported on the body of the user, and which permits the rapid and uniform tying of what is known in the trade as "true flat knots."

A further object is to provide a knotter of the character stated which can be manufactured and sold at an extremely low price, and which will most efficiently perform the functions for which it is intended.

With these and other objects in view, the invention consists in certain novel features of construction and combinations and arrangements of parts as will be more fully hereinafter described and pointed out in the claims.

Figure 1:
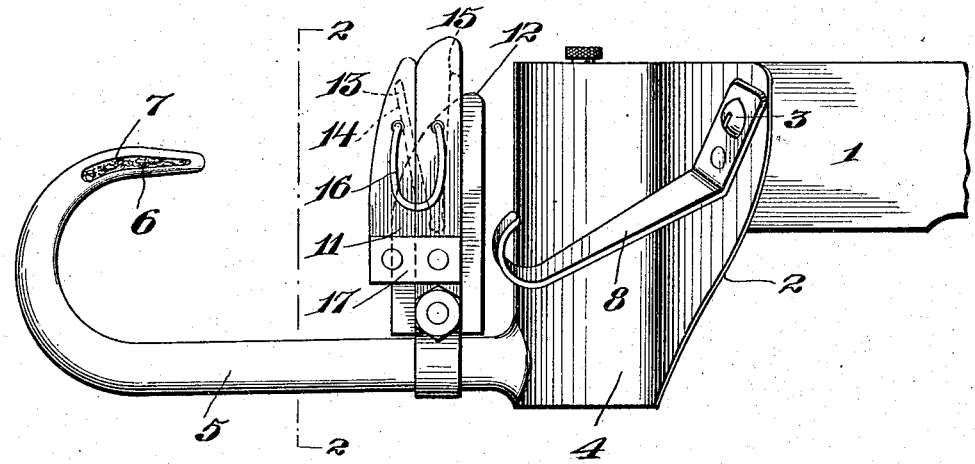
Figure 2:
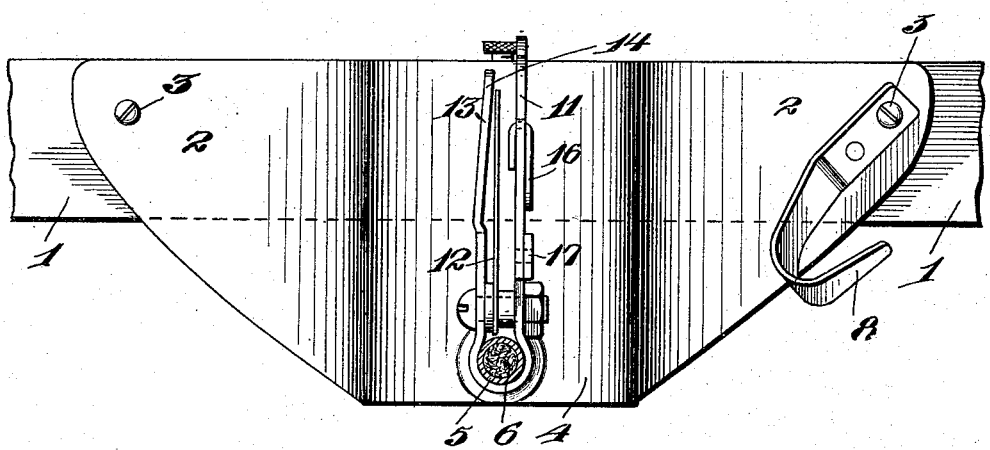

In the accompanying drawings: Figure 1 is a view in side elevation illustrating my improvements. Fig. 2 is a view in section on the line 2—2 of Fig. 1. Fig. 3 is a top plan view showing the strap as it goes around the body of the user. Fig. 4 is a diagrammatic plan view showing the manner of tying the knot. Fig. 5 is a view in longitudinal section on the line 5—5 of Fig. 3. Fig. 6 is a fragmentary plan view showing the knot as drawn on the end of the hook.

1 represents a strap adapted to be positioned around the body of the user and support a plate 2 at the front of the body which plate is secured by bolts 3 to the strap. A tank 4 is provided on plate 2, and communicates at its lower end with a hollow hook 5. This hook 5 contains a wick 6 which projects into the tank 4, and adjacent the free end of hook 5, is exposed through slots 7 in the sides of the hook. The hook gradually reduces in diameter to its free end so that the knot can slip off the end of the hook. A guide hook 8 is secured to plate 2, but I may of course use other forms of guide for the cord. On the hook 5, I locate a combined gage and cutter 9, which comprises three parts, namely, a gage 11, a blade 12, and a guard 13 located side by side. The gage 11 consists of two members 14 and 15 held together by a spring 16, said members pivotally connected to a base 17.

The cutting blade 12 is located the desired distance from the gage 11, and the guard 13 which is of general forked shape, is spaced the desired distance from the other side of the blade and prevents any danger of cutting the fingers while severing the ends of the cord.

The operation of my improvements is as follows, attention being particularly directed to Fig. 4: 18 and 19 represent the two cords to be knotted, and these cords are drawn from spools or other source of supply 20 and 21 respectively. Cord 18 is placed over hook 5, and cord 19 is then positioned over cord 18 as shown at 22, thence under cord 18 as shown at 23, thence over cord 18 as shown at 24, and again over the cord 18 as shown at 25, thence under the cord 18 as shown at 26, thence back over the cord 18 as shown at 27. When the strands of the cords are drawn in the direction of the arrows, as shown in Fig. 6, a knot will be formed around the hook, which is known in the trade as a "square knot" and as the knot is formed it is drawn off the end of the hook. In drawing off the knot, it comes in contact with the wick 6 which moistens the cord and insures a tight small smooth knot to pass through the eye of the needle. The operator then grasps the two ends of the cord in one hand, and places the knot against the outer face of the gage 11, moving the ends of the cord downwardly through the guard 13 against the cutting blade 12, and severing the ends of the cord. By this method the cord ends are cut uniformly and as close to the knot as is deemed safe.

While I have illustrated and described my invention as being employed to tie and moisten a "square knot," it will be noted that my invention may be advantageously used for the tying of knots of other descriptions, the moistening hook or horn being so designed that as the knot is tightened and pulled thereover, it will moisten the knot and thereby prevent it from slipping. I preferably use water in the tank 4 to moisten the cord, but I of course do not limit myself in this particular. This liquid is supplied through an opening 10 in the top of the tank, normally closed by a plug 10$^a$.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A knotter of the character described, comprising a hollow member, and a moistened wick in said member, said member having openings therein exposing the wick, substantially as described.

2. A knotter of the character described, comprising a hollow hook, reducing in diameter to a relatively small free end, said hook having slots in its sides adjacent its free end, and a moistening wick in said hook exposed at the slots, substantially as described.

3. A knotter of the character described, comprising a hollow hook, reducing in diameter to a relatively small free end, said hook having slots in its sides adjacent its free end, a moistening wick in said hook exposed at the slots, and a tank containing liquid communicating with the hook and into which said wick projects, substantially as described.

4. In a knotter of the character described, the combination with a strap adapted to be positioned around the body of the user, a tank secured to the strap, a hollow hook communicating with the tank and having slots in its sides adjacent its free end, and a wick in said hook exposed at the slots and projecting into the tank, substantially as described.

5. In a knotter of the character described, the combination with a strap adapted to be positioned around the body of the user, a tank secured to the strap, a hollow hook communicating with the tank and having slots in its sides adjacent its free end, a wick in said hook exposed at the slots and projecting into the tank, and a second hook supported by the strap at a point removed from the first-mentioned hook, substantially as described.

6. In a knotter of the character described, the combination with a strap adapted to be positioned around the body of the user, a tank secured to the strap, a hollow hook communicating with the tank and having slots in its sides adjacent its free end, a wick in said hook exposed at the slots and projecting into the tank, and a combined gage and cutter supported on the first-mentioned hook, substantially as described.

7. In a knotter of the character described, the combination with a strap adapted to be positioned around the body of the user, a tank secured to the strap, a hollow hook communicating with the tank and having slots in its sides adjacent its free end, a wick in said hook exposed at the slots and projecting into the tank, a second hook supported by the strap at a point removed from the first-mentioned hook, and a combined gage and cutter supported on the first-mentioned hook, substantially as described.

8. In a knotter of the character described, the combination with a strap adapted to be positioned around the body of the user, a tank secured to the strap, a hollow hook communicating with the tank and having slots in its sides adjacent its free end, a wick in said hook exposed at the slots and projecting into the tank, a gage supported on the first-mentioned hook and comprising two members normally spring-pressed together and adapted to receive the cord between them, a blade located beside the gage, and a guard supported on the hook at a point removed from the cutter, substantially as described.

9. In a knotter of the character described, the combination with a strap adapted to be positioned around the body of the user, a tank secured to the strap, a hollow hook communicating with the tank and having slots in its sides adjacent its free end, a wick in said hook exposed at the slots and projecting into the tank, and a second hook supported by the strap at a point removed from the first-mentioned hook, a gage supported on the first-mentioned hook and comprising two members normally spring-pressed together and adapted to receive the cord between them, a blade located beside the gage, and a guard supported on the hook at a point removed from the cutter, substantially as described.

In testimony whereof I have signed my name to this specification in the presence of two subscribing witnesses.

MOSES EWING.

Witnesses:
S. P. RUFF, Jr.,
THOS. P. BOYLE.